US008788302B1

(12) United States Patent
Goodwin, III et al.

(10) Patent No.: US 8,788,302 B1
(45) Date of Patent: Jul. 22, 2014

(54) METHOD OF CONTROLLING A SELF-SERVICE TERMINAL

(75) Inventors: John C. Goodwin, III, Suwanee, GA (US); Michael E. Halpern, Collingswood, NJ (US)

(73) Assignee: NCR Corporation, Duluth, GA (US)

( * ) Notice: Subject to any disclaimer, the term of this patent is extended or adjusted under 35 U.S.C. 154(b) by 2206 days.

(21) Appl. No.: 10/101,584

(22) Filed: Mar. 20, 2002

(51) Int. Cl.
*G06Q 10/00* (2012.01)

(52) U.S. Cl.
USPC .......................................................... 705/5

(58) Field of Classification Search
USPC .................................................. 705/17, 16, 5
See application file for complete search history.

(56) References Cited

U.S. PATENT DOCUMENTS

| | | | | | |
|---|---|---|---|---|---|
| 4,247,759 A | * | 1/1981 | Yuris et al. | ...................... | 235/381 |
| 4,449,186 A | * | 5/1984 | Kelly et al. | ......................... | 705/5 |
| 4,862,357 A | * | 8/1989 | Ahlstrom et al. | .................. | 705/6 |
| 4,884,199 A | * | 11/1989 | Boothroyd et al. | ............. | 715/709 |
| 4,984,156 A | * | 1/1991 | Mekata | ................................ | 705/5 |
| 5,237,499 A | * | 8/1993 | Garback | ............................ | 705/5 |
| 5,239,480 A | * | 8/1993 | Huegel | ............................... | 705/5 |
| 5,253,166 A | * | 10/1993 | Dettelbach et al. | ................ | 705/5 |
| 5,255,184 A | * | 10/1993 | Hornick et al. | ..................... | 705/6 |
| 5,331,546 A | * | 7/1994 | Webber et al. | ...................... | 705/6 |
| 5,393,964 A | * | 2/1995 | Hamilton et al. | ............... | 235/381 |
| 5,422,809 A | * | 6/1995 | Griffin et al. | ....................... | 705/5 |
| 5,550,746 A | * | 8/1996 | Jacobs | ............................ | 700/231 |
| 5,590,197 A | * | 12/1996 | Chen et al. | ......................... | 705/65 |
| 5,644,721 A | * | 7/1997 | Chung et al. | ....................... | 705/6 |
| 5,724,521 A | * | 3/1998 | Dedrick | ............................ | 705/26 |
| 5,727,129 A | * | 3/1998 | Barrett et al. | .................... | 706/10 |
| 5,732,398 A | * | 3/1998 | Tagawa | ............................... | 705/5 |
| 5,781,909 A | * | 7/1998 | Logan et al. | .................... | 707/200 |
| 5,797,127 A | * | 8/1998 | Walker et al. | ....................... | 705/5 |
| 5,805,167 A | * | 9/1998 | van Cruyningen | ............ | 715/808 |
| 5,832,451 A | * | 11/1998 | Flake et al. | ......................... | 705/5 |
| 5,832,454 A | * | 11/1998 | Jafri et al. | ............................ | 705/6 |
| 5,839,114 A | * | 11/1998 | Lynch et al. | ........................ | 705/5 |
| 5,877,485 A | * | 3/1999 | Swartz | ........................... | 235/383 |
| 5,897,620 A | * | 4/1999 | Walker et al. | ...................... | 705/5 |
| 5,901,067 A | * | 5/1999 | Kao et al. | ........................ | 364/492 |
| 5,920,053 A | * | 7/1999 | DeBrouse | ...................... | 235/375 |
| 5,933,812 A | * | 8/1999 | Meyer et al. | ...................... | 705/15 |
| 5,948,040 A | * | 9/1999 | DeLorme et al. | ............. | 701/201 |
| 5,949,411 A | * | 9/1999 | Doerr et al. | .................... | 715/716 |

(Continued)

FOREIGN PATENT DOCUMENTS

| | | | | | |
|---|---|---|---|---|---|
| WO | WO 99/21141 | * | 4/1999 | ............. | G06F 17/42 |
| WO | WO 99/28830 | * | 6/1999 | ............. | G06F 15/30 |

OTHER PUBLICATIONS

White, Ron, How Computers Work, Millennium Ed. Que Corporation, Sep. 1999.*

(Continued)

*Primary Examiner* — Nathan Erb
(74) *Attorney, Agent, or Firm* — Paul W. Martin; Peter H. Priest

(57) ABSTRACT

A method of controlling a self-service terminal which makes optimal use of features offered by the self-service terminal. The method includes the steps of monitoring operation of a self-service terminal application, determining features of the self-service terminal application used by operators, storing usage information about the features, identifying triggering information, analyzing the usage information and the triggering information to determine optimal features to enable in the self-service terminal application, and enabling the optimal features.

7 Claims, 2 Drawing Sheets

(56) References Cited

U.S. PATENT DOCUMENTS

| | | | | |
|---|---|---|---|---|
| 5,991,735 | A * | 11/1999 | Gerace | 705/10 |
| 6,023,679 | A * | 2/2000 | Acebo et al. | 705/5 |
| 6,041,308 | A * | 3/2000 | Walker et al. | 705/14 |
| 6,044,353 | A * | 3/2000 | Pugliese, III | 705/5 |
| 6,079,863 | A * | 6/2000 | Furukawa et al. | 705/5 |
| 6,088,367 | A * | 7/2000 | Skells | 370/468 |
| 6,115,690 | A * | 9/2000 | Wong | 705/7 |
| 6,167,381 | A * | 12/2000 | Swaine et al. | 705/17 |
| 6,195,694 | B1 * | 2/2001 | Chen et al. | 709/220 |
| 6,209,026 | B1 * | 3/2001 | Ran et al. | 709/218 |
| 6,229,534 | B1 * | 5/2001 | Gerra et al. | 715/733 |
| 6,295,521 | B1 * | 9/2001 | DeMarcken et al. | 705/6 |
| 6,304,850 | B1 * | 10/2001 | Keller et al. | 705/5 |
| 6,308,887 | B1 * | 10/2001 | Korman et al. | 235/379 |
| 6,311,165 | B1 * | 10/2001 | Coutts et al. | 705/21 |
| 6,318,536 | B1 * | 11/2001 | Korman et al. | 194/217 |
| 6,360,205 | B1 * | 3/2002 | Iyengar et al. | 705/5 |
| 6,381,582 | B1 * | 4/2002 | Walker et al. | 705/26 |
| 6,408,279 | B1 * | 6/2002 | Mason | 705/16 |
| 6,422,462 | B1 * | 7/2002 | Cohen | 235/381 |
| 6,456,981 | B1 * | 9/2002 | Dejaeger et al. | 705/14 |
| 6,460,058 | B2 * | 10/2002 | Koppolu et al. | 715/738 |
| 6,549,912 | B1 * | 4/2003 | Chen | 707/104.1 |
| 6,594,548 | B2 * | 7/2003 | Bagnordi | 700/233 |
| 6,595,342 | B1 * | 7/2003 | Maritzen et al. | 194/212 |
| 6,695,203 | B2 * | 2/2004 | Iki et al. | 235/375 |
| 6,801,226 | B1 * | 10/2004 | Daughtrey | 715/763 |
| 6,839,679 | B1 * | 1/2005 | Lynch et al. | 705/5 |
| 6,931,406 | B2 * | 8/2005 | Stern | 707/10 |
| 7,209,892 | B1 * | 4/2007 | Galuten et al. | 705/26 |
| 2001/0016825 | A1 * | 8/2001 | Pugliese, III et al. | 705/5 |
| 2002/0082745 | A1 * | 6/2002 | Wilmott et al. | 700/233 |
| 2002/0129170 | A1 * | 9/2002 | Moore et al. | 709/249 |
| 2002/0178034 | A1 * | 11/2002 | Gardner et al. | 705/5 |
| 2003/0088617 | A1 * | 5/2003 | Clark et al. | 709/203 |
| 2003/0171966 | A1 * | 9/2003 | Goodwin et al. | 705/8 |
| 2003/0171967 | A1 * | 9/2003 | Goodwin et al. | 705/8 |
| 2003/0171985 | A1 * | 9/2003 | Prabhu et al. | 705/14 |
| 2004/0064371 | A1 * | 4/2004 | Crapo | 705/14 |

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Bornhovd, Chirstof, "Semantic Metadata for the Integration of Web-based Data for Electronic Commerce," 0-7695-0334-9/99, IEEE, Sep. 1999.*

Muller, Nathan J., Desktop Encyclopedia of the Internet, Artech House, Inc., 1998.*

White, Ron, How Computers Work, 6th Ed., Que Corporation, Sep. 10, 2001.*

Gralla, Preston, How the Internet Works, 6th Ed., Que Corporation, Sep. 7, 2001.*

The Bank Credit Card Business, 2nd Edition, American Bankers Association, 1996.*

Northwest Florida Daily News, "Wireless Has Hit Bottom," Fort Walton Beach, Florida, Aug. 5, 2001, p. E.1.*

* cited by examiner

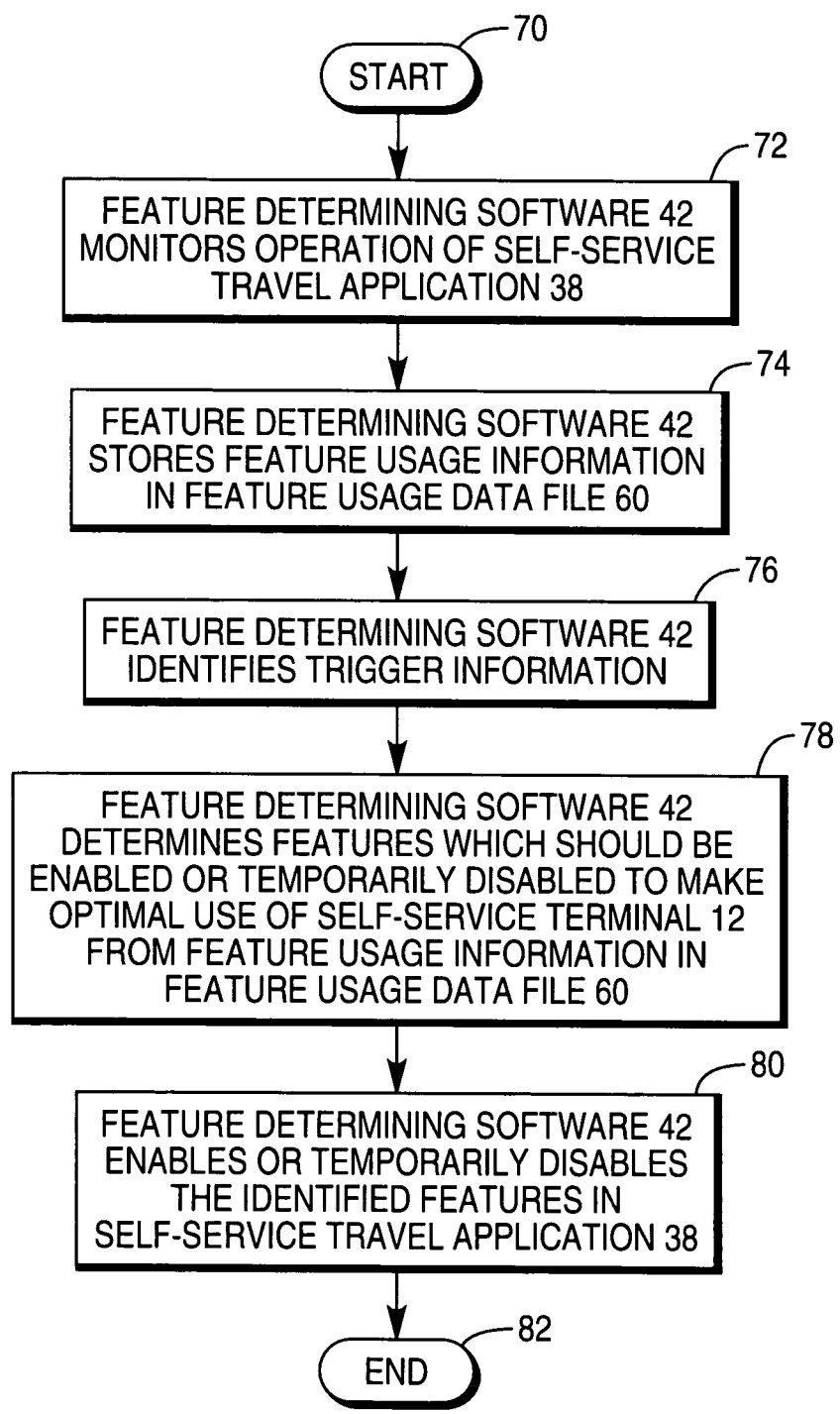

METHOD OF CONTROLLING A SELF-SERVICE TERMINAL

BACKGROUND OF THE INVENTION

The present invention relates to self-service kiosks and more specifically to a method of controlling a self-service terminal.

Kiosks are self-service terminals. Kiosks provide a publicly accessible computing platform for displaying World Wide Web (web) pages and other web-delivered content from web sites. Kiosks may be located within a retailer's transaction establishment or elsewhere, such as in shopping malls. Kiosks may be easily networked to web sites using the TCP/IP protocol. Web pages from web sites may be displayed using known and available web software, such as Microsoft® Internet Explorer software.

Service companies deploy kiosks in order to improve the quality of their services and to provide customers with more service options. For example, transportation companies may deploy kiosks to reduce passenger waiting time in check-in lines.

Kiosk owners wish to make optimal use of kiosks. Therefore, it would be desirable to provide a method of controlling a self-service terminal.

SUMMARY OF THE INVENTION

In accordance with the teachings of the present invention, a method of controlling a self-service terminal is provided.

The method includes the steps of monitoring operation of a self-service terminal application, determining features of the self-service terminal application used by operators, storing usage information about the features, identifying triggering information, analyzing the usage information and the triggering information to determine optimal features to enable in the self-service terminal application, and enabling the optimal features.

It is accordingly an object of the present invention to provide a method of controlling a self-service terminal.

It is another object of the present invention to make optimal use of deployed self-service terminals.

It is another object of the present invention to determine through analysis of usage statistics operational features of a self-service terminal.

It is another object of the present invention to determine through real-time analysis of usage statistics features of a self-service terminal which should be enabled and features which should be disabled.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating the method of the present invention.

DETAILED DESCRIPTION OF THE PREFERRED EMBODIMENT

Figure 1:
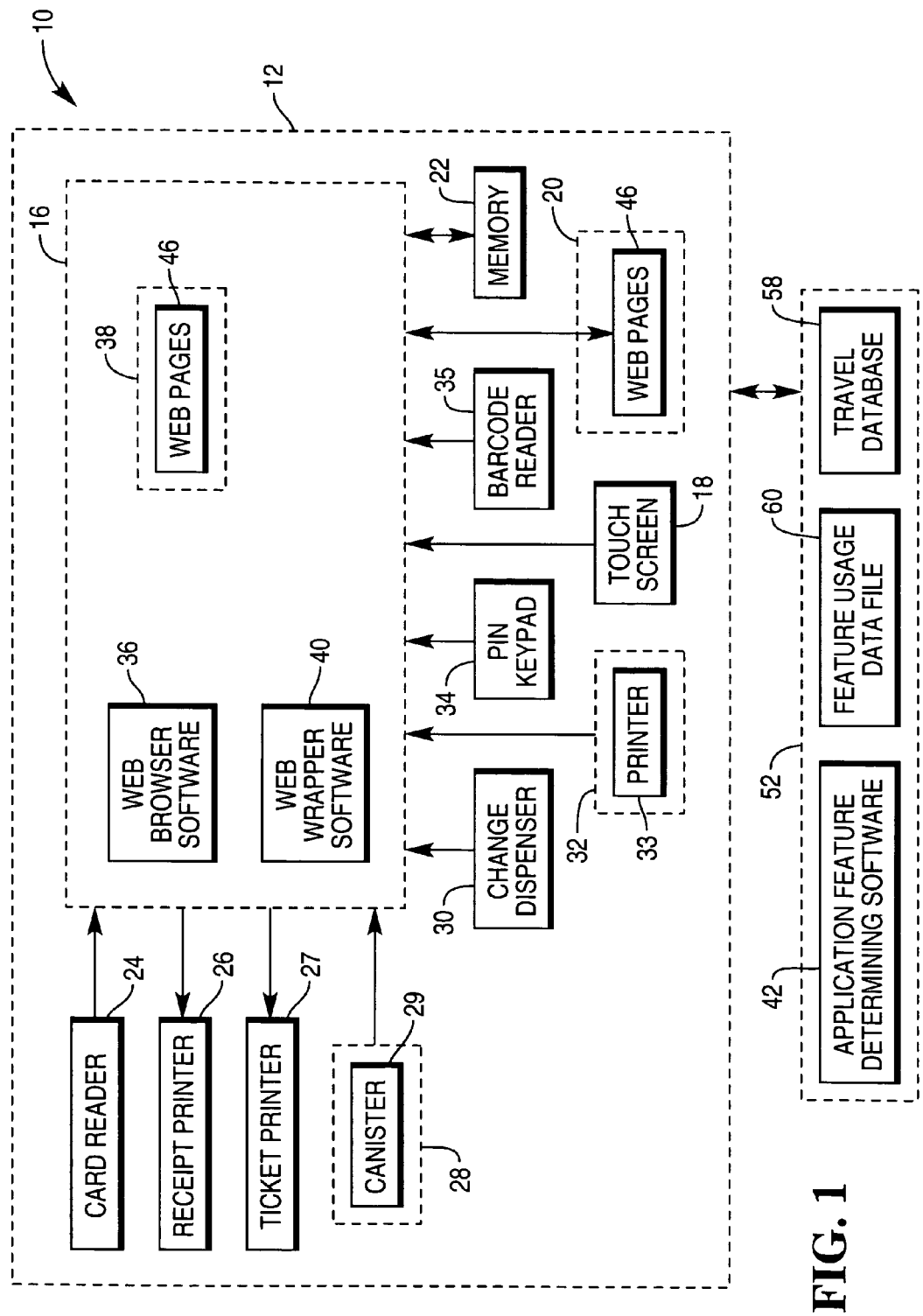
FIG. 1 is a block diagram of a transportation system.

Turning now to FIG. 1, travel system 10 includes self-service terminal 12, which is preferably a kiosk located in a travel building, such as an airport or train station. Self-service terminal 12 may include an NCR 7401 computer.

Self-service terminal 12 primarily includes processor 16, touch screen 18, memory 22, and storage medium 20. Self-service terminal 12 may be simple and include only receipt printer 26, ticket printer 27, and card reader 24. Self-service terminal 12 may include a number of other peripherals, including, cash acceptor 28, cash dispenser 30, check reader 32, personal identification number (PIN) keypad 34, and barcode reader 35.

Processor 16 executes self-service travel application 38, which processes travel-related requests from passengers. For example, a passenger may use self-service travel application 38 to complete the check-in process, issue a boarding pass, change travel routes, or get scheduling information. Self-service travel self-service travel application 38 records passenger identification information, retrieves itinerary information from travel database 58 through server 52, displays instructions for completing check-in, records any payments due, dispenses any change due, prints boarding passes and tickets, and prints receipts. In addition, self-service travel self-service travel application 38 records and stores check-in time.

Application 38 communicates with server 52 over a network connection, such as one which uses the TCP/IP protocol. Application 38 obtains and stores travel information in travel database 58.

Processor 16 may also execute web browser software 36 and web wrapper software 40.

Web browser software 36 allows an operator to display information in a format established by the World Wide Web (WWW or "web"). Application 38 may be written as a web application which displays travel information in the form of web pages 46, although application 38 may also be a non-web application and operate without web browser software 36 and web wrapper software 40. Web pages 46 may be written using hypertext markup language (HTML) or other suitable web page language.

Web browser software 36 may include commercially available web browser software, such as Microsoft® Internet Explorer web browser software. Microsoft® Internet Explorer web browser software is configured into a kiosk operation using a "-k" command line option. This option hides toolbars and menu bars to prevent operator access to those functions.

Web browser software 36 may also display a start or "home" page within web pages 46 which operates as a default page from which kiosk operation begins and to which operation returns when an operator is finished using self-service terminal 12.

Web wrapper software 40 provides security functions. During operation, web wrapper software 40 prevents an operator from accessing kiosk files, or other applications, or the operating system software, or basic input-output system (BIOS) firmware, and prevents the operator from causing self-service terminal 12 to reboot.

Touch screen 18 records passenger selections and displays information to self-service passengers.

Storage medium 20 stores web pages 46 for use by application 38.

Memory 22 stores executed program information.

Card reader 24 reads passenger identification, credit, debit, SMART, and/or other types of cards carried by a passenger. Card reader 24 may record payment information from a passenger.

Printer 26 prints receipt information.

Printer 27 prints tickets and boarding passes.

Cash acceptor 28 includes currency storage canister 29. Cash acceptor 28 takes in currency, validates the currency, sends tendered amount information to application 38, and sends currency count information to application 38. Cash acceptor 28 may include a cash acceptor manufactured by CashCode or Mars.

Cash dispenser 30 dispenses any change due.

Check reader 32 reads checks and includes a magnetic ink character (MICR) reader. Check reader 32 also includes printer 33 for printing information on checks.

PIN keypad 34 records PIN numbers for debit card transactions.

Self-service terminal 12 may additionally include barcode reader 35, which may be used to scan barcode labels on tickets. The barcode labels contain passenger identification information.

Server 52 executes feature determining software 42, which monitors use of hardware and software features of self-service terminal 12 by travelers. Feature determining software 42 stores feature usage information in feature usage data file 60. Feature determining software 42 analyzes stored historical feature usage information and presently obtained traveler information to determine which features should be available or temporarily suspended.

Feature determining software 42 uses various techniques for enabling or disabling features. For example, feature determining software 42 may gray out buttons which access certain features. Feature determining software 42 may remove features altogether. Finally, feature determining software 42 may skip to certain features or bypass other features.

Feature determining software 42 uses flags and software parameters, that are based on historical and anticipated results. For example, if cash takes six to eight seconds per bill to insert into a single bill acceptor, feature determining software 42 may gray out the cash button during busy times.

Feature determining software 42 may trigger off of passenger information or transportation information. For example, feature determining software 42 may determine that a large number of travelers will be present at a given time of day or departure time. Feature determining software 42 may disable options in self-service travel application 38 for selecting cash acceptor 28, cash dispenser 30, check reader 32, and PIN keypad 34 in favor of accepting payment only through card reader 24.

As another example, feature determining software 42 may determine that a particular traveler only uses self-service terminal 12 to issue a boarding pass. Feature determining software 42 may disable all other options in self-service travel application 38.

As another example, feature determining software 42 may disallow browsing of future travel plans during busy times.

As another example, feature determining software 42 may jump to check-in features, skipping all other features, if a passenger is running late.

Server 52 stores feature usage information in feature usage data file 60. Server 52 also stores travel database 58 which contains information about transportation routes, travelers, reservations, and itineraries.

Turning now to FIG. 2, operation of feature determining software 42 is illustrated in detail beginning with START 70.

In step 72, feature determining software 42 monitors operation of self service travel application 38.

In step 74, feature determining software 42 stores feature usage information in feature usage data file 60.

In step 76, feature determining software 42 identifies trigger information. Trigger information may include departure and arrival times, traveler identification information, trip length, type of traveler, past history of features used, or other information.

In step 78, feature determining software 42 determines features which should be enabled or temporarily disabled to make optimal use of self-service terminal 12 from feature usage information in feature usage data file 60.

In step 80, feature determining software 42 enables or temporarily disables the identified features in self-service travel application 38. Preferably, feature determining software 42.

Operation ends at step 82.

Although the present invention has been described with particular reference to certain preferred embodiments thereof, variations and modifications of the present invention can be effected within the spirit and scope of the following claims.

The invention claimed is:

1. A method of controlling a self-service travel terminal using a pre-programmed computer comprising the steps of:
   (a) monitoring operation of a self-service terminal application with the computer;
   (b) determining with the computer, user selectable features of the self-service terminal application used by a plurality of operators;
   (c) collecting and storing usage information about how the user selectable features are used by the plurality of operators with the computer;
   (d) identifying with the computer, trigger information providing a predetermined reason for changing availability of one or more of the user selectable features of the self-service terminal application including a departure time;
   (e) analyzing, with the computer, the usage information and the trigger information to determine which of the user selectable features to enable in the self-service terminal application;
   (f) enabling determined user selectable features with the computer;
   (g) determining that a function corresponding to a button takes too long; and
   (h) graying out the button if it is determined a function corresponding to the button takes too long.

2. The method as recited in claim 1, wherein step (d) comprises the substep of:
   identifying a traveler, determining that the traveler only uses the self-service terminal for one option, and disabling the other options.

3. The method as recited in claim 1, wherein step (d) comprises the substep of:
   identifying an arrival time.

4. The method as recited in claim 1, wherein step (d) comprises the substep of:
   identifying passenger loads.

5. The method as recited in claim 1, wherein step (d) comprises the substep of:
   identifying a trip length.

6. The method of claim 1, wherein step (c) comprises the substep of:
   storing information relating to the historical use by operators of a cash payment option feature.

7. The method of claim 1, wherein step (c) comprises the substep of:
   storing information relating to the historical use by operators of an internet browsing feature.

\* \* \* \* \*